United States Patent
Rowe et al.

(10) Patent No.: US 9,141,224 B1
(45) Date of Patent: Sep. 22, 2015

(54) SHIELDING CAPACITIVE TOUCH DISPLAY

(75) Inventors: Gabriel Isaiah Rowe, Fremont, CA (US); Robert Waverly Zehner, Los Gatos, CA (US); Nikolai Orlov, Toronto (CA)

(73) Assignee: Amazon Technologies, Inc., Reno, NV (US)

( * ) Notice: Subject to any disclaimer, the term of this patent is extended or adjusted under 35 U.S.C. 154(b) by 112 days.

(21) Appl. No.: 13/474,483

(22) Filed: May 17, 2012

(51) Int. Cl.
*G09G 5/00* (2006.01)
*G06F 3/041* (2006.01)

(52) U.S. Cl.
CPC .................. *G06F 3/0414* (2013.01)

(58) Field of Classification Search
CPC ... G06F 3/0414; G06F 3/0416; G06F 3/0488; G06F 3/044; G06F 3/03547; G06F 1/1633; G06F 1/1626; G06F 2203/04107
USPC ............. 345/173–178; 178/18.01–18.06; 455/556.1, 556.2, 566
See application file for complete search history.

(56) References Cited

U.S. PATENT DOCUMENTS

| | | | |
|---|---|---|---|
| 2007/0195553 A1* | 8/2007 | Tsai et al. | 362/623 |
| 2009/0231252 A1* | 9/2009 | Maegawa | 345/87 |
| 2011/0037707 A1* | 2/2011 | Radivojevic et al. | 345/173 |
| 2011/0111807 A1* | 5/2011 | Kido | 455/566 |
| 2011/0285661 A1* | 11/2011 | Hotelling | 345/174 |
| 2012/0056848 A1* | 3/2012 | Yamano et al. | 345/174 |
| 2012/0182261 A1* | 7/2012 | Wang et al. | 345/174 |
| 2012/0242676 A1* | 9/2012 | George | 345/589 |
| 2013/0016060 A1* | 1/2013 | Pereverzev et al. | 345/174 |
| 2013/0069906 A1* | 3/2013 | Tu et al. | 345/174 |

* cited by examiner

*Primary Examiner* — Jennifer Nguyen
(74) *Attorney, Agent, or Firm* — Novak Druce Connolly Bove + Quigg LLP

(57) ABSTRACT

The ability to effect a change in capacitance is not limited to one side of a capacitive touch element. Objects on an opposite side, or approaching from the opposite side, of a touch element can distort the electrostatic field. In some instances, overall device thickness can be such that the presence of a user's fingers on the back of a portable computing device (e.g., when holding the device) can be sensed by the capacitive touch screen on the front of the device. In various embodiments, a metallic plain, shield, or other conductive layer is provided for devices such as, smartphones, tablet computers, and other computing devices to eliminate, or at least reduce, any potential measurable change in capacitance caused by objects behind the touch panel.

16 Claims, 4 Drawing Sheets

SHIELDING CAPACITIVE TOUCH DISPLAY

BACKGROUND

People are increasingly utilizing a variety of computing devices, including portable devices such as tablet computers and smart phones. These devices typically often include touch-sensitive displays enabling a user to provide input to a device through contact with a display screen. These touch sensitive displays typically include an insulator such as glass, coated with a transparent conductor above a display for a graphical user interface. Since the human body is an electrical conductor, touching the surface of the screen results in a distortion of the screen's electrostatic field, which is measurable as a change in capacitance. This measurable change in capacitance is used to detect the presence and location of a touch within the display area. The ability to effect a change in capacitance, however, is not limited to only one side of the transparent conductor making a touch sensitive display susceptible to measuring false inputs from objects on all sides.

BRIEF DESCRIPTION OF THE DRAWINGS

Various embodiments in accordance with the present disclosure will be described with reference to the drawings, in which.

DETAILED DESCRIPTION

Figure 1A:
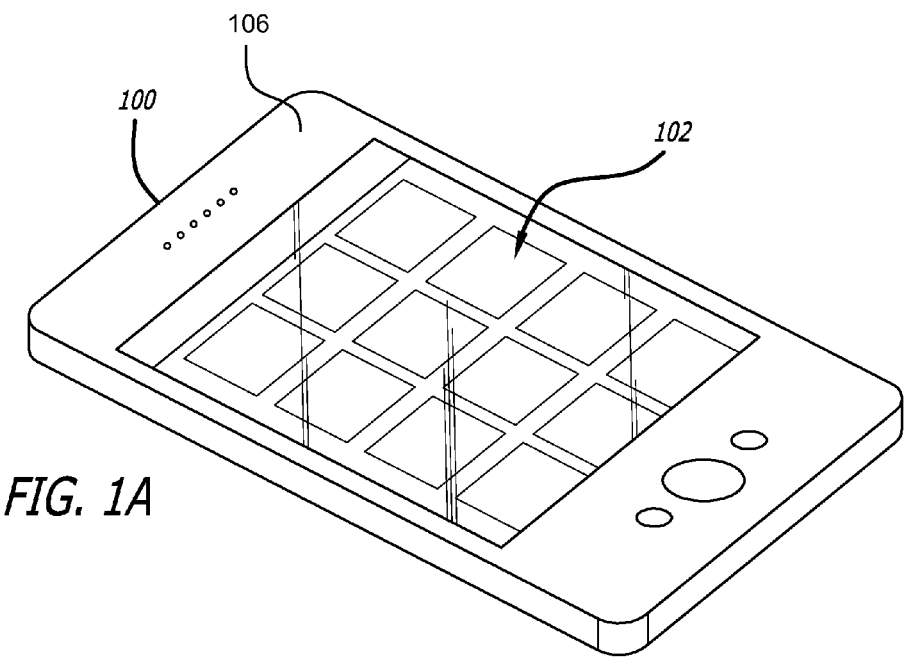
FIGS. 1A and 1B illustrate an example portable computing device that can be utilized in various embodiments.

Systems and methods in accordance with various embodiments of the present disclosure may overcome one or more of the aforementioned and other deficiencies experienced in conventional approaches to providing capacitive touch capability in an electronic device. In particular, various embodiments provide approaches for reducing a likelihood of detecting unintended input associated with objects near a capacitive touch screen. Approaches discussed herein can minimize and/or prevent the capacitive coupling of objects behind a display element with one or more sensors of a capacitive touch screen in relatively thin devices.

In one embodiment, a capacitive touch element for a touchscreen panel includes an insulator such as glass, coated with a transparent conductive film such as indium tin oxide (ITO). The transparent conductor is patterned into a plurality of capacitance sensing nodes or electrodes. Each node works independent of other nodes to produce concurrent signals that represent different points on the touch screen. The nodes may be based, for example, on self-capacitance or mutual capacitance. Self-capacitance refers to a configuration wherein changes in an electrode's capacitance are measured relative to a ground. For example, the electrodes can be patterned into spatially separated electrodes and traces. In this example, each electrode represents a different coordinate and the traces connect the electrodes to a sensing circuit and the circuit monitors each electrode for changes in capacitance. Since the human body is an electrical conductor, touching the surface of a touch screen results in a distortion of the screen's electrostatic field, which is measurable as a change in capacitance as an object, such as a user's finger, draws charge toward it and, thus, away from the electrode. The coordinates of electrodes where the changes in capacitance are sensed are used to recognize and locate a touch input.

Mutual capacitance refers to a state where changes in capacitance are measured between two electrodes. In this example, the electrodes are created by a two layer grid of conductive lines, or wires, separated from each other by a determined distance. The upper layer conductive lines could run along an x-axis (rows) of a plain, the lower layer could run along a y-axis (columns), and the separation between the upper and lower layers could be along a z-axis, for example. Sensing points can be provided at regions near the x-y intersections of the rows and columns. The rows can be charged, for example, resulting in the rows capacitively coupled to the columns. During operation, as a conductive object approaches the surface of the touch screen, the approaching object capacitively couples to the rows at the intersections in close proximity to the object, which steals charge away from the rows, thereby reducing the charge in the columns. The change in charge is measured by a circuit which can determine the position of one or more objects with respect to the grid.

The ability to effect a change in capacitance is not limited to one side of a capacitive touch element. Objects on the opposite side, or approaching from the opposite side, of a touch element can distort the electrostatic field as well. This can lead to false input signals, or noise, and can be particularly troublesome in thin devices, such as those less than ~0.75 cm thick. In some instances, overall device thickness can be such that the presence of a user's fingers on the back of a portable computing device (e.g., when holding the device) can be sensed by the capacitive touch screen on the front of the device. In various embodiments, a metallic plain, shield, or other electrically conductively layer is provided for devices, such as smartphones, tablet computers, and other computing devices, to eliminate, or at least reduce, any potential measurable change in capacitance caused by objects at least partially behind the touch panel.

Various other applications, processes and uses are presented below with respect to the various embodiments.

Figure 1B:
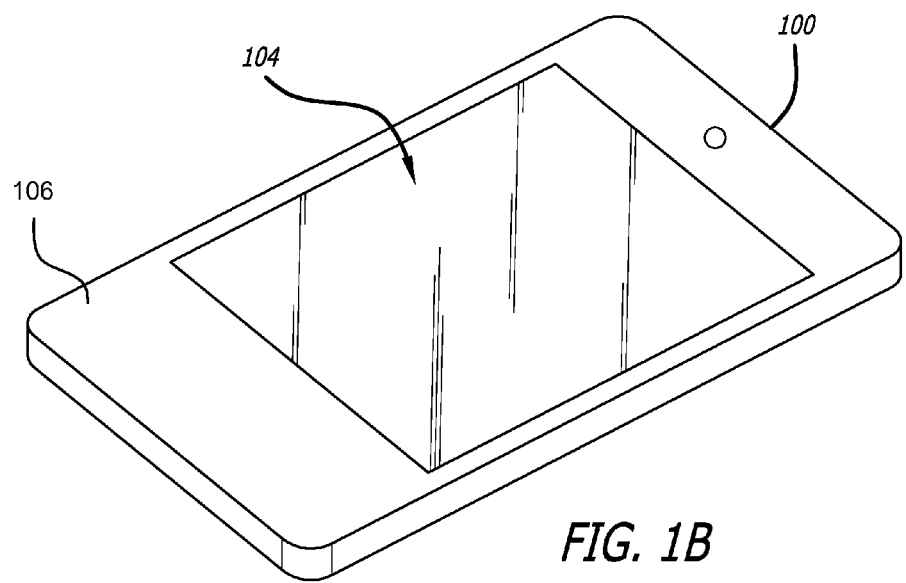

FIGS. 1A and 1B illustrate an example computing device 100 with a touch panel display screen 102, in accordance with various embodiments. The touch screen 102 is capable of sensing the position of objects that make contact thereon, and can be based on self-capacitance or mutual capacitance, as described above. A conventional glass touch panel design uses a cover glass made from chemically strengthened glass, an optically clear adhesive (OCA), and another piece of glass, which is typically the sensor glass layer. The sensing glass layer includes a plurality of transparent sensing electrodes where each electrode represents different coordinates in the plane of the screen. Due to its high transparency, low color shift, high conductivity, and ease of patterning, indium tin oxide (ITO) is an example of a transparent conductor material that can be used to pattern the electrodes. The electrodes are configured to receive the capacitive input from one or more objects touching the screen 102 in the vicinity of one or more electrodes. When a charged object moves close to an electrode, the object attracts charge away from the electrode thereby affecting the electrostatic field and changing the electrode's capacitance by a measurable amount. The electrodes are connected to a circuit through lines or traces patterned by, for example, an ITO sputtering process. Other patterning processes may include for example, deposition, etching, printing and the like. The electrodes are spaced apart to electrically isolate them from each other and to provide space for routing the signals through the traces. The electrodes, traces, and sensing circuit are generally disposed together on a glass, as described above, although any other optically transmissible substrate will do.

Figure 2A:
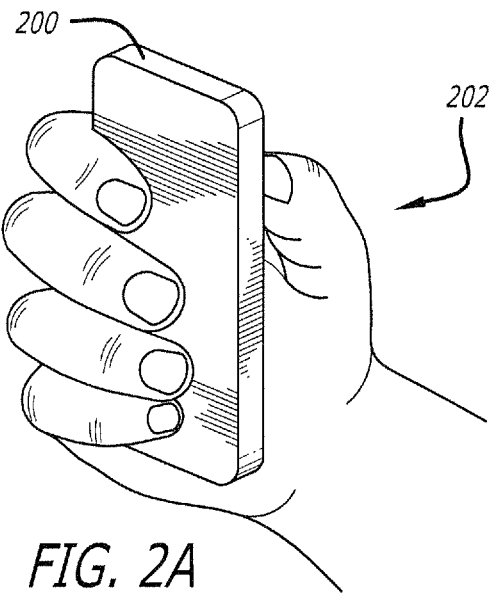
FIGS. 2A and 2B respectively illustrate an example perspective view from the rear and a side view of a user holding a portable computing device, in accordance with various embodiments.
Figure 2B:
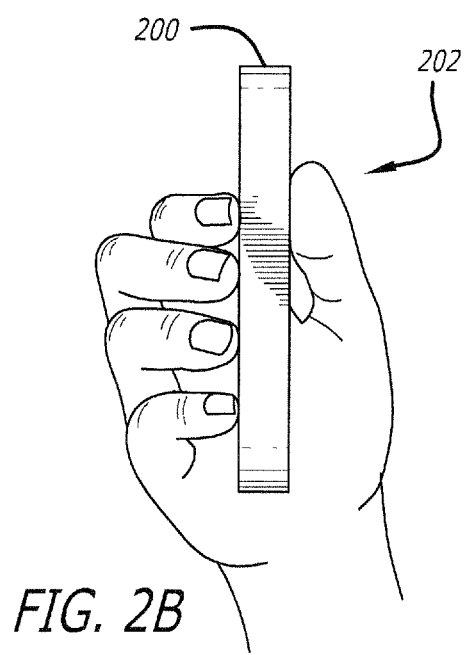

FIGS. 2A and 2B illustrate two views of an example situation of a user 202 holding a portable computing device 200, which may or may not be the same computing device 100. In this example, the user's fingers are in contact with the back of the device 200, which in some cases might be interpreted as touch inputs since the ability to effect a change in capacitance is generally not limited to one side of a capacitive touch screen, such as screen 102. In order to address this issue and others, an electrically grounded conductive layer or element is provided in various embodiments.

Figure 3:
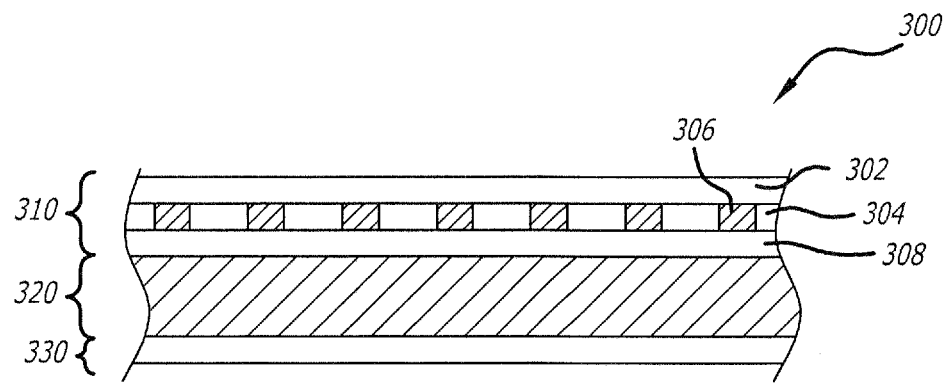
FIG. 3 illustrates a cross sectional example of a computing device, in accordance with one embodiment.

As an example, in accordance with one embodiment, FIG. 3 illustrates a conductive layer 330 of a portable computing device stack 300. The stack 300 includes a capacitive touch element 310, a display element 320, and an electrically conducting layer 330. The capacitive touch element 310 includes a top protective glass layer 302 and an electrode layer under the protective glass layer 302 that includes sensor lines 306 and an optically clear adhesive (OCA) 304. The optically clear adhesive adheres the protective glass layer 302 to the electrode layer and/or a glass substrate 308. The sensor lines 306, for example, may be printed on the glass substrate 308. Under the capacitive touch element 310 is the display element 320. It should be understood, however, that in different embodiments the capacitive layer could be under, or incorporated at least partially within, the display element. In various embodiments, the display element 320 could a liquid crystal display (LCD), an electrophoretic (EPD) or E-Ink display, a digital micromirror display (DMD), an Organic Light Emitting Diode (OLED) display, a wedge optic display, any element that includes an array of pixels, or any other display element. In this example, the conductive layer 330 is beneath the display element 320. The conductive layer 330 will have either a size or shape, such as a size roughly equal to the area of an active area of the touch element 310, for example, to prevent the capacitive touch element 310 from capacitively coupling with objects within a detectable distance behind a portable computing device. The conductive layer 330 and touch element 310 are connected to a ground circuit of the device in order to keep a relative electrostatic equilibrium between each element. This electrostatic equilibrium substantially blocks any field distortion from affecting the electrodes of the touch element 310 as long as the conductive layer 330 is between the touch element 310 and any charged foreign object. The conductive layer 330 could, for example, be a metal sputtered on the back of the display element 320, such as a thin film of copper, silver, aluminum, any other metal, conductive adhesive, or polymer with similar conducting properties, or a film or coating on a Mylar® or other polyester-based substrate. The conductive layer 330 could alternatively be a metallic tape, a free floating metallic member, or at least one structural member within the device casing. The reflector of the backlight assembly for a display, such as display element 320, could be electrically grounded by being connected to the circuit ground to effectively and additionally, act as the conductive layer 330. Though not illustrated, the conductive layer 330 could also be located against an inner wall of the device casing and, in some instances, a device casing may be provided to act as a conductive element itself for shielding electrodes associated with a touch element 310 from measuring, reading, or registering false inputs caused by objects, such as a user's fingers or a metal table, for example, coming from behind the device.

Figure 4:
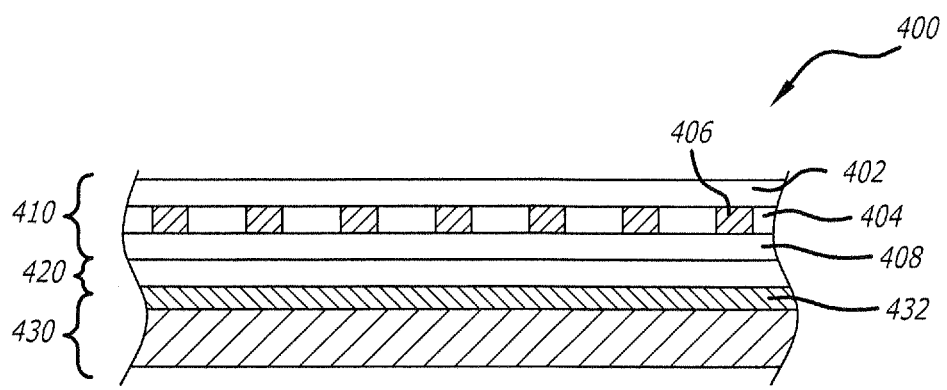
FIG. 4 illustrates another cross sectional example of a computing device, in accordance with one embodiment.

Another example of a conductive layer, in accordance with another embodiment, is illustrated in FIG. 4 as conductive layer 420 of a portable computing device stack 400. The stack 400 includes a capacitive touch element 410, a conductive layer 420, and a display element 430. The stack 400 differs from the stack 300, described in FIG. 3, with respect to the location, placement, or order of the conductive layer 420. For example, the capacitive touch element 410 includes a top protective glass layer 402 and an electrode layer under the protective glass layer 402 that includes sensor lines 406 and an optically clear adhesive (OCA) 404. The optically clear adhesive binds the protective glass layer 402 to the electrode layer and a glass substrate 408 on which the electrodes may be printed. Under the touch element 410, however, is the conductive layer 420 in this example, which is between the touch element 410 and a display element 430. In this example, since the conductive layer 420 is above the display element 430, the conductive layer 420 must be a substantially transparent or made of an optically transmissible material, such as a thin layer of indium tin oxide (ITO). An appropriate location for an ITO layer between the touch element 410 and a display element 430 could be on a surface of the polarizer 432 that is part of the display assembly for a display, such as display element 430, for example.

In the above two examples described with respect to FIG. 3 and FIG. 4, the device stacks illustrate examples of self-capacitance touch elements, but could just as easily have been illustrated with examples of mutual capacitance touch elements. A device stack utilizing mutual capacitance would include a few additional layers to incorporate another level of conducting lines perpendicular to the electrodes 306 and 406, as well as an additional layer representing the spacing between the two electrode layers.

Figure 5:
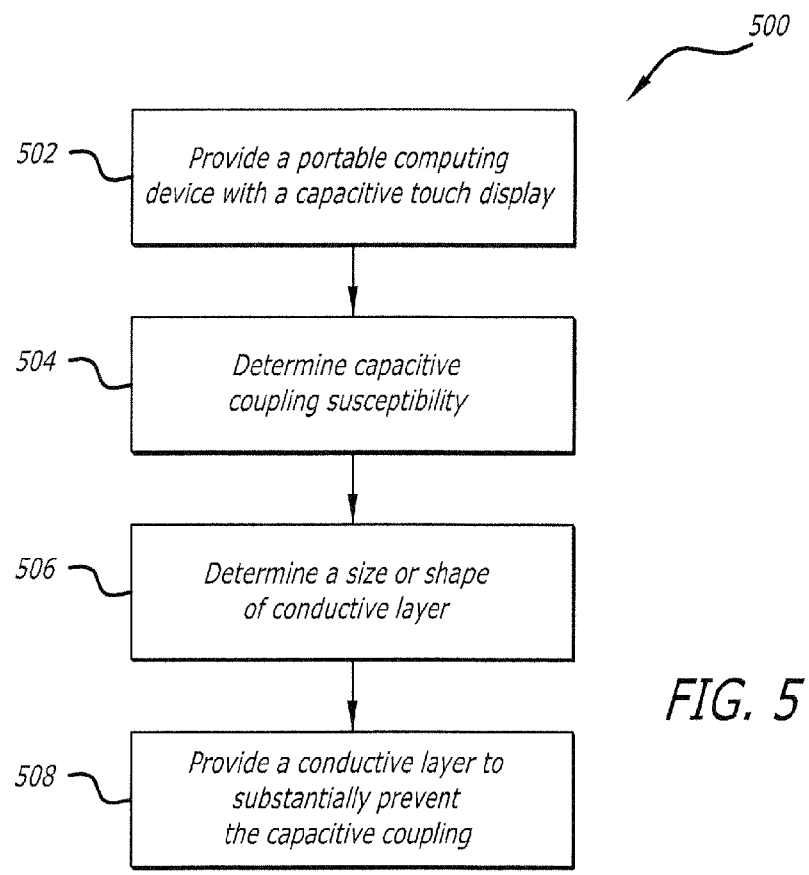
FIG. 5 illustrates an example process for providing a conductive layer for a capacitive touch display of a portable computing device, in accordance with various embodiments.

FIG. 5 illustrates an example process 500 for providing a conductive layer in a portable computing device in accordance with various embodiments. It should be understood that, for any process discussed herein, there can be additional, fewer, or alternative steps performed in similar or alternative orders, or in parallel, within the scope of the various embodiments unless otherwise stated. In this example, a portable computing device with a capacitive touch display configured to display content from a first face of the portable computing device is provided 502. In one instance, the device can be described by conventional terms as slim or thin to very thin, which could mean that the device has a thickness between 0.25 and 1.0 centimeters, or less than about 0.75 centimeters, among other such options. In this example, a capacitive coupling susceptibility of the capacitive touch display with respect to objects positioned within a detectable distance of a second or opposite face of the portable computing device is determined 504. Determining a capacitive coupling susceptibility can involve determining how easily objects (e.g. a user's fingers, a metal table, and like conductors) behind the device, could interfere, cause false positive inputs, or inadvertently trigger sensing to a plurality of electrodes associated with a touch sensor. In this example, at least one of a size or shape of a conductive layer needed to reduce the capacitive coupling susceptibility to below an allowable coupling threshold is determined 506. In this example, a conductive layer is provided towards the second face, or rear, from the capacitive touch display 508. Since the conductive layer is electrically grounded, it can substantially prevent the capacitive touch display from capacitively coupling with objects, such as those described above, within a detectable distance of the rear face of the portable computing device.

Referring back to FIGS. 1A and 1B, in one embodiment a portable computing device 100 includes a case 106 for holding various device elements such as processor, memory, battery, and the like. The device case 106 has a first side where a display screen, such as display screen 102, is located and a second side or back. The first display 102 has a capacitive touch element configured thereon to enable a user to provide input to the device by positioning an object, such as a user's finger, within a detectable distance of the surface. A conductive layer is also disposed within the device case 106. The conductive layer is between the capacitive touch element and the back of the device casing 106 and in some instances, the layer can be incorporated into the device case 106. The conductive layer is connected to a ground and has a size and/or a shape sufficient to prevent backside objects, positioned within a detectable distance behind the back of the device case 106, from being detected by the capacitive touch element.

In another embodiment, a second display element 104 can be disposed on the second side of the device described above and include a second capacitive touch element. In this case, a second conductive layer disposed in the device can be provided between the second capacitive touch element and the display element of the primary side. The secondary conductive layer can also be connected to the device ground and have many of the same features and characteristics as the first conductive layer. The first and second display elements can be a liquid crystal display (LCD), an electrophoretic display (EPD), electronic paper display, E-Ink display, a digital micromirror display (DMD), an Organic Light Emitting Diode (OLED) display, or any other display with pixels under a touch sensitive element. The first and second displays could be the same display type or any combination thereof. In some instances, the entire portable computing device could have a display characteristic. For example, the first or primary screen could be an LCD screen in a rectangle shape and the rest of the device could include an electrophoretic or E-Ink display.

Figure 6:
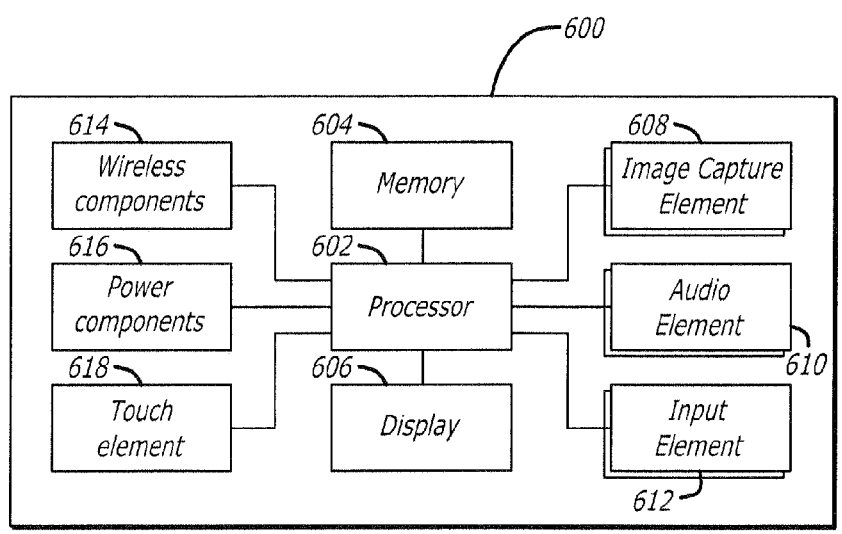
FIG. 6 illustrates a component level example of a computing device that can be utilized in accordance with various embodiments.

In order to provide various functionality described herein, FIG. 6 illustrates an example set of basic components of a computing device 600, such as the device 100 described with respect to FIGS. 1A and 1B. In this example, the device includes at least one central processor 602 for executing instructions that can be stored in at least one memory device or element 604. As would be apparent to one of ordinary skill in the art, the device can include many types of memory, data storage or non-transitory computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 608, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 610, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device.

The device can include at least one additional input device 612 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 614 operable to communicate with one or more portable computing devices within a communication range of the particular wireless channel. The wireless channel can be any' appropriate channel used to enable devices to communicate wirelessly, such as Bluetooth, cellular, or Wi-Fi channels. It should be understood that the device can have one or more conventional wired communications connections as known in the art. The example device includes various power components 616 known in the art for providing power to a portable computing device, which can include capacitive charging elements for use with a power pad or similar device as discussed elsewhere herein. The example device also can include at least one touch- and/or pressure-sensitive element 618, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A portable computing device, comprising:
  a processor;
  a memory including instructions that, upon being executed by the processor, enable the processor to cause content to be rendered for display;
  a device case for holding the processor and the memory, the device case having a first member and a second member separated by a distance from the first member, the second member having a first surface and an opposing second surface;
  a display element configured to display, wherein the display element is positioned at the first member;
  a capacitive sensing element configured to detect an object positioned within a detectable distance of the display element, the object being used to provide input to the portable computing device;

an electrically conductive element incorporated in the first surface of the second member, the electrically conductive element being connected to a device ground and having at least one of a size or a shape sufficient to prevent objects, that are positioned external to the portable computing device and in proximity to the second surface of the second member, from being detected by the capacitive sensing element.

2. The portable computing device of claim 1, wherein the electrically conductive element is a layer of Indium Tin Oxide (ITO).

3. The portable computing device of claim 1, wherein the display element is one of a liquid crystal display (LCD), a digital micromirror display (DMD), or an Organic Light Emitting Diode (OLED) display.

4. The portable computing device of claim 1, wherein the portable computing device is less than 0.75 centimeters thick.

5. A touch screen display device, comprising:
   a processor;
   a memory storing instructions executable by the processor;
   a device case having a first member and a second member separated by a distance from the first member, the second member having a first surface and an opposing second surface;
   a display element configured to display content from a display side of the display element, the display element having a second side opposite the display side;
   a capacitive sensing element configured to detect touch inputs on the display side of the display element; and
   a conductive element, incorporated in the first surface of the second member, positioned to prevent objects within a detectable distance of the second side of the display element and in proximity to the second surface of the second member, from being detected by the capacitive sensing element.

6. The touch screen display device of claim 5, wherein the conductive element is connected to a device ground.

7. The touch screen display device of claim 5, wherein the conductive element has an area substantially equal in size to an active area of the capacitive sensing element.

8. The touch screen display device of claim 5, wherein the display element is one of a liquid crystal display (LCD), an electrophoretic display (EPD), a digital micromirror display (DMD), a wedge optic projector, or an Organic Light Emitting Diode (OLED) display.

9. The touch screen display device of claim 5, wherein the touch screen display device is part of a portable computing device, and wherein the portable computing device is less than 0.75 centimeters thick.

10. The touch screen display device of claim 5, wherein the sensing element and the conductive element are connected to a device ground.

11. The touch screen display device of claim 5, wherein the conductive element is a layer of Indium Tin Oxide (ITO).

12. A method comprising:
   providing a capacitive touch display in a portable computing device, the capacitive touch display being configured to display;
   providing a device case for the portable computing device, the device case having a first member and a second member separated by a first distance from the first member, the second member having a first surface and an opposing second surface;
   determining a capacitive coupling susceptibility of the capacitive touch display with respect to objects that are positioned within a detectable distance of the second surface of the second member; and
   providing a conductive element incorporated in the first surface of the second member, the conductive element being electrically grounded and configured to prevent the capacitive touch display from capacitively coupling with objects within the detectable distance.

13. The method of claim 12, wherein the conductive element is a layer of Indium Tin Oxide (ITO).

14. The method of claim 12, wherein the capacitive touch display is one of a liquid crystal display (LCD), an electrophoretic display (EPD), a digital micromirror display (DMD), or an Organic Light Emitting Diode (OLED) display.

15. The method of claim 12, wherein the portable computing device is less than 0.75 centimeters.

16. The method of claim 12, wherein the conductive element has an area substantially equal in size to an active area of the capacitive touch display.

* * * * *